Nov. 21, 1967 H. J. BEUSCHER 3,354,410
METHOD FOR REDUCING INTERFERENCE CAUSED BY ELECTROMAGNETIC RADIATION FROM CLOCK CONTROLLED SYSTEMS
Filed July 22, 1965
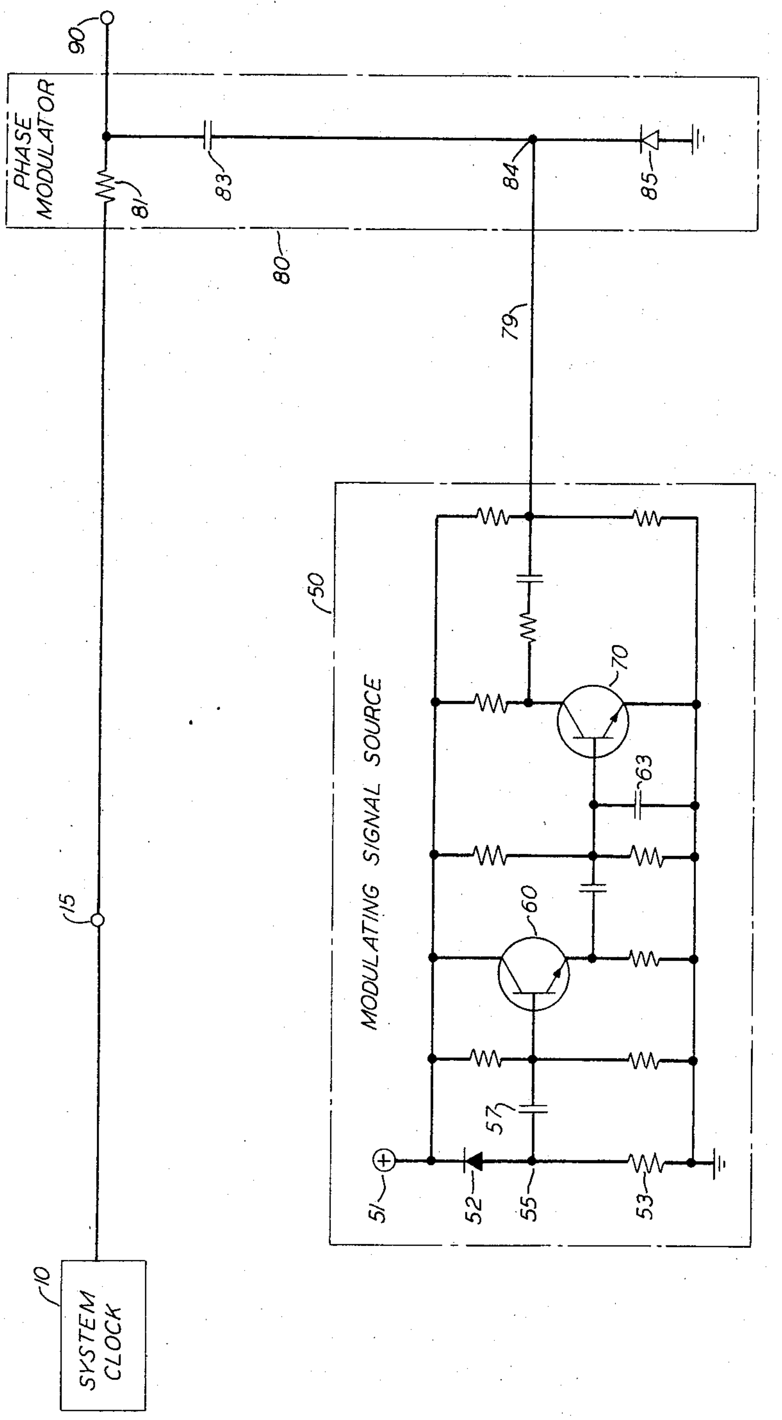
INVENTOR
H. J. BEUSCHER
BY D. J. Suedeker
ATTORNEY United States Patent Office 3,354,410
Patented Nov. 21, 1967

3,354,410
METHOD FOR REDUCING INTERFERENCE CAUSED BY ELECTROMAGNETIC RADIATION FROM CLOCK CONTROLLED SYSTEMS

Hugh J. Beuscher, Oceanport, N.J., assignor to Bell Telephone Laboratories, Incorporated, New York, N.Y., a corporation of New York Filed July 22, 1965, Ser. No. 474,104
10 Claims. (Cl. 332—18)

This invention relates to clock controlled systems and more particularly to a method and arrangement for reducing interference caused by electromagnetic radiation from clock controlled systems.

In many fields today, and especially in the communications, computer, and data processing fields, various systems are employed which utilize or are controlled by a clock. The clock generally comprises some form of oscillator for generating timing pulses at a predetermined frequency, which pulses are employed at various points throughout the system for timing or synchronizing the operation thereof. The clock may also include circuitry for counting down the basic predetermined timing pulse frequency to provide timing pulses at other frequencies which are subharmonics of the basic frequency of the clock oscillator. Problems frequently arise in connection with the operation of these systems due to electromagnetic radiation produced thereby, a substantial part of which radiation is related to the clock timing pulses. The electromagnetic radiation is often of sufficient intensity to cause excessive interference with other equipment, such as communications receivers.

A well-known method of reducing the radiated electromagnetic energy to an acceptable level is to shield the system equipment. This has proved very effective where the equipment is enclosed and is relatively compact. However, in systems where the equipment is not normally enclosed, in larger systems, and particularly in systems where the equipment is distributed over a considerable area, shielding is neither a desirable nor a practical solution. The amount of shielding required is rather extensive in such instances and thus represents an expensive solution to the problem. Further, in such systems shielding may give rise to operational and maintenance difficulties due to cooling problems and due to poor access to the equipment.

The electromagnetic radiation produced by the clock timing pulses is concentrated at discrete frequencies which are harmonics of the basic clock frequency, and subharmonics thereof in the case of timing pulses which are counted down from the basic clock frequency. It is at one or more of these discrete frequencies that interference with nearby communications equipment may result. It is known to frequency modulate the system clock to reduce the electromagnetic radiation level at the discrete frequencies by distributing the energy at a considerably lower intensity over the frequency modulation spectrum. Such an arrangement is disclosed in C. F. Ault patent application Ser. No. 409,836, filed Nov. 9, 1964. However, in most clock controlled systems, clock frequency modulating arrangements have been found to require considerable additional circuitry for phase locking the mean frequency of the system clock to a reference crystal oscillator.

Accordingly, it is a general object of this invention to provide a new and improved method for reducing interference caused by electromagnetic radiation from clock controlled systems.

More specifically, it is an object of this invention to reduce interference caused by electromagnetic radiation from clock controlled systems by a method which is simple and economical and which overcomes the disadvantages of known methods.

A further object of this invention is to reduce interference caused by electromagnetic radiation from clock controlled systems without modifying the system operation and without shielding the system equipment.

Yet another object of this invention is to reduce interference caused by electromagnetic radiation from clock controlled systems with a minimum of modification of the system clock and without requiring additional phase locking or reference oscillator circuitry.

In accordance with a feature of my invention, the above and other objects are attained in a simple and economical manner by modulating the phase of the system clock. I have found that by modulating the phase of the system clock the total radiated electromagnetic energy is distributed at a considerably lower intensity over the phase modulation spectrum rather than having the energy concentrated at the original discrete frequencies. Thus, the energy radiated at any particular frequency is considerably reduced, thereby reducing interference, and without any requirement for a second reference frequency oscillator or for circuitry for phase locking the system clock to such a reference oscillator. Instead, only a single oscillator is required to form the system clock, which advantageously may be a crystal oscillator.

A further feature of my invention relates to the use of a random signal for modulating the phase of a system clock to reduce interference caused by electromagnetic radiation from the system while minimizing coherence in communications receivers.

The above and other objects and features of the present invention may be fully apprehended from the following detailed description when considered with reference to the accompanying drawing, which shows an illustrative embodiment of an arrangement for performing the method of the present invention.

In the drawing, system clock 10 is shown for providing timing pulses at pulse terminal 15, which timing pulses are normally extended to output terminal 90 and employed, for example, to control the operation of communications or data processing equipment. Clock 10 may illustratively, comprise a crystal oscillator of predetermined frequency for providing the timing pulses at pulse terminal 15, and the pulses may be further counted down to provide other timing pulses at frequencies which are subharmonics of the predetermined frequency of clock 10. The spectrum of electromagnetic energy radiated by the system thus comprises discrete frequencies which are harmonics of the predetermined clock frequency and also comprises discrete frequencies which are subharmonics of the predetermined clock frequency in the case of timing pulses which are counted down from the clock frequency. Interference with nearby communications equipment may result from electromagnetic radiation at one or more of these discrete frequencies. In accordance with the present invention, this interference is reduced substantially to an acceptable level by modulating the phase of clock 10, that is, by modulating the phase of the clock timing pulses provided at terminal 15 by clock 10.

The phase of clock 10 is modulated in accordance with the present invention by the output of modulating signal source 50 through the use of phase modulator 80 interconnected between pulse terminal 15 and output terminal 90. Phase modulator 80, in the illustrative embodiment of the drawing, comprises a simple resistive-capacitive network including resistor 81, capacitor 83, and varactor diode 85. Varactor diode 85 functions as a variable capacitance, the effective capacitance thereof varying according to the potential of the modulating signal applied over lead 79 to terminal 84 by modulating signal source 50. Thus, the output signal $E_o$ of phase modulator 80 at output terminal 90 is related to the input signal $E_n$ applied to terminal 15 from clock 10 by the following equation:

$$E_o(\omega)=E_n(\omega)\frac{\frac{1}{j\omega C}}{R+\frac{1}{j\omega C}}$$

$$=\frac{1-j\omega RC}{1+\omega^2R^2C^2}E_n(\omega) \qquad (1)$$

where R is the resistance of resistor 81 and C is the sum of the effective capacitance of diode 85 and the capacitance of capacitor 83.

The modulating signal on lead 79 from modulating signal source 50 in the illustrative embodiment of the drawing is a random or noise signal derived from the avalanche effect breakdown of diode 52, direct current from source 51 being connected through diode 52 and resistor 53 to ground. The noise signal from diode 52 at terminal 55, intermediate diode 52 and resistor 53, is extended through capacitor 57 to a two-stage amplifier comprising transistors 60 and 70. The amplifier stage comprising transistor 60 is connected in emitter-follower configuration and is provided for impedance matching purposes. The amplifier stage comprising transistor 70 provides suitable gain to the noise signal for driving varactor diode 85 in phase modulator 80.

The effect of modulating the phase of clock 10 through the use of phase modulator 80 is to vary the point in time of the rise and fall, that is, of the leading and trailing edges of the clock timing pulses applied to terminal 15. This pulse edge variation is sometimes referred to as jitter. The larger the clock phase deviation the greater the jitter placed on the timing pulse edges. For the greatest reduction in interference in accordance with the present invention, the phase deviation should be as large as practical within the limits of the particular system in which the timing pulses are employed. Generally speaking, the amount of jitter permissible without adversely affecting system operation is quite small, permitting a timing pulse phase deviation no greater than perhaps 0.05 radian which, however, is sufficient to substantially reduce interference due to electromagnetic radiation.

Interrelated with the factor of phase deviation of the clock is the frequency of the modulating signal. The phase modulation spectrum comprises a number of sidebands around the clock frequency and around each harmonic thereof, with the selected phase deviation determining the frequency swing around the clock frequency and its harmonics. The number of sidebands in the phase modulation spectrum relative to the clock frequency and to each harmonic thereof is determined by the frequency of the modulating signal. The lower the modulation signal frequency the greater the number of sidebands and thus the greater the distribution of frequencies at which the electromagnetic energy is radiated by the system. Although the total radiated energy is essentially the same as when concentrated at the clock frequency and its harmonics, when the energy is distributed over the phase modulation spectrum, the intensity of the radiated energy at any particular frequency is reduced considerably.

Ideally, therefore, the clock frequency is modulated with a very low frequency in the audio range, such as 100 cycles per second, and with as large a phase deviation as practicable within the limits of the system. Assuming a phase deviation of 0.03 radian and a clock frequency of 300 kilocycles, by way of example, the electromagnetic energy radiated by the system is distributed over a 9 kilocycle band at the clock frequency, over an 18 kilocycle band at 600 kilocycles, over a 27 kilocycle band at 900 kilocycles, and so forth. With a modulation signal frequency of 100 cycles per second, each band comprises a phase modulation spectrum including the clock frequency or harmonic thereof and sidebands spaced at 100 cycles per second intervals therefrom. In the illustrative example assumed above, therefore, the result of distributing the radiated electromagnetic energy is that the magnitude of the energy at any frequency within the bands around the clock frequency and around the harmonics thereof is advantageously reduced to a level below the magnitude of the energy at these frequencies without phase modulation of the clock. At the higher harmonics of the clock frequency, the energy is decreased to an even greater extent since the bandwidth over which the energy is distributed is greater. Thus, it will be apparent that the reduction in interference effected by the present invention is substantial at the clock frequency, and is even more pronounced at the frequencies in the higher harmonic frequency spectrums. This is particularly advantageous inasmuch as it is generally at the higher frequencies, such as those in the megacycles, that the greatest interference from electromagnetic radiation occurs.

If the modulation signal is a discrete audio frequency as assumed above, however, it may give rise to coherence in the form of audible audio signals in communications receivers at the various clock and harmonic frequencies. This is objectionable and may be avoided in accordance with an aspect of the present invention by using a random or noise signal for modulating the clock phase, as shown in the illustrative embodiment in the drawing. The effect on communications receivers of a noise signal for modulation purposes is at worst a slight increase in the background noise level. However, the noise signal may be limited advantageously to the audio frequency range, such as in modulating signal source 50 through the use of the low-pass filter comprising capacitor 63.

The frequency of the phase modulated clock output at output terminal 90 is dependent upon the frequency and amplitude of the modulating signal on lead 79 from modulating signal source 50. In some applications it may be desirable to eliminate the dependence of the clock output on the modulating signal frequency. This may be accomplished readily by integrating the output of modulating signal source 50 and applying the integrated output over lead 79 to phase modulator 80. Actually this is partially accomplished in the illustrative arrangement shown in the drawing by capacitor 63 which integrates the modulating signal at frequencies thereof above the audio range, thereby eliminating dependence of the modulated clock output frequency upon the higher frequencies of the modulating signal.

It is to be understood that the above-described arrangements are merely illustrative of the principles of the present invention. Numerous other arrangements may be devised by those skilled in the art without departing from the spirit and scope of the invention.

What is claimed is:

1. A method for reducing interference caused by electromagnetic radiation from a clock controlled system which comprises modulating the phase of the clock.

2. A method for reducing interference caused by electromagnetic radiation from a clock controlled system which comprises modulating the clock phase with a low frequency signal.

3. A method for reducing interference caused by electromagnetic radiation from a clock controlled system which comprises modulating the clock phase with a random signal.

4. A method for reducing interference caused by electromagnetic radiation from a clock controlled system which comprises modulating the clock phase with a signal having frequency components only in the audio frequency band.

5. A method for reducing interference caused by electromagnetic radiation from a system employing a clock which method comprises modulating the phase of said clock with a signal of one or more frequencies, each said modulating signal frequency being substantially less than said predetermined frequency of said clock.

6. In a system employing timing pulses generated by an oscillator of predetermined frequency, a method for reducing the level of electromagnetic energy radiated by said system at said predetermined frequency and at harmonics of said predetermined frequency, which method comprises modulating the phase of said timing pulses from said oscillator with a signal having frequency components substantially only in the audio frequency band.

7. In a system controlled by a clock, the combination for reducing interference caused by electromagnetic radiation from said system comprising a random signal generator, and means for modulating the phase of said clock with the random signal output of said random signal generator.

8. In a system controlled by a clock, the combination in accordance with claim 7 for reducing interference caused by electromagnetic radiation from said system further comprising, means for limiting the frequency of said random signal output of said random signal generator to the audio frequency band.

9. In a system employing an oscillator of predetermined frequency the combination for reducing interference caused by electromagnetic radiation from said system at said predetermined frequency and at harmonic frequencies thereof comprising means for generating a signal of one or more frequencies each substantially lower than said predetermined frequency of said oscillator, and means for modulating the phase of said oscillator with said signal.

10. In a system the combination comprising, means for generating timing pulses at a predetermined frequency for controlling the operation of said system, said system radiating electromagnetic energy at said predetermined frequency and at harmonic frequencies thereof, and means for distributing said electromagnetic energy at a substantially lower intensity over a spectrum of frequencies centered around said predetermined frequency and said harmonic frequencies, said energy distributing means comprising means for modulating the phase of said timing pulses.

References Cited

UNITED STATES PATENTS 2,352,254 6/1944 Curtis.

ROY LAKE, *Primary Examiner.*

J. KOMINSKI, *Assistant Examiner.*